(12) United States Patent
Debnath et al.

(10) Patent No.: US 12,707,072 B2
(45) Date of Patent: Aug. 11, 2026

(54) ENCODING AND DECODING IMAGES USING DIFFERENTIABLE JPEG COMPRESSION

(71) Applicant: NEC Laboratories America, Inc., Princeton, NJ (US)

(72) Inventors: Biplob Debnath, Princeton, NJ (US); Deep Patel, Franklin Park, NJ (US); Srimat Chakradhar, Manalapan, NJ (US); Christoph Reich, Hessen (DE)

(73) Assignee: NEC Corporation, Tokyo (JP)

( * ) Notice: Subject to any disclaimer, the term of this patent is extended or adjusted under 35 U.S.C. 154(b) by 100 days.

(21) Appl. No.: 18/755,150

(22) Filed: Jun. 26, 2024

(65) Prior Publication Data

US 2025/0008132 A1 Jan. 2, 2025

Related U.S. Application Data

(60) Provisional application No. 63/535,381, filed on Aug. 30, 2023, provisional application No. 63/523,508, filed on Jun. 27, 2023.

(51) Int. Cl.
*H04N 19/33* (2014.01)
*H04N 19/124* (2014.01)
(Continued)

(52) U.S. Cl.
CPC ........... *H04N 19/33* (2014.11); *H04N 19/124* (2014.11); *H04N 19/176* (2014.11); *H04N 19/186* (2014.11); *H04N 19/625* (2014.11)

(58) Field of Classification Search
CPC .... H04N 19/33; H04N 19/124; H04N 19/176; H04N 19/186; H04N 19/625; H04N 19/60
(Continued)

(56) References Cited

U.S. PATENT DOCUMENTS 11,638,025 B2 * 4/2023 Pourreza .................. G06N 3/09 375/240.12
11,825,090 B1 * 11/2023 Said ....................... G06N 3/084
(Continued)

OTHER PUBLICATIONS

Bengio, Y., Léonard, N., & Courville, A. (Aug. 15, 2013). Estimating or propagating gradients through stochastic neurons for conditional computation. arXiv preprint arXiv:1308.3432.
(Continued)

*Primary Examiner* — Susan E. Hodges
(74) *Attorney, Agent, or Firm* — Vincent Duffy

(57) ABSTRACT

Systems and methods are provided for encoding and decoding images using differentiable JPEG compression, including converting images from RGB color space to YCbCr color space to obtain a luminance and chrominance channels, and applying chroma subsampling to the chrominance channels to reduce resolution. The YCbCr image is divided into pixel blocks and a DCT is performed on the pixel blocks to obtain DCT coefficients. DCT coefficients are quantized using a scaled quantization table to reduce precision, and quantized DCT coefficients are encoded using lossless entropy coding, forming a compressed JPEG file decoded by reversing the lossless entropy coding to obtain quantized DCT coefficients, which are dequantized using the scaled quantization table to restore the precision. The dequantized DCT coefficients are converted back to a spatial domain using an IDCT, the chrominance channels are upsampled to original resolution, and the YCbCr image is converted back to the RGB color space.

20 Claims, 7 Drawing Sheets

(51) Int. Cl.
*H04N 19/176* (2014.01)
*H04N 19/186* (2014.01)
*H04N 19/625* (2014.01)

(58) Field of Classification Search
USPC .................................................. 375/40, 240
See application file for complete search history.

(56) References Cited

U.S. PATENT DOCUMENTS

2003/0091242 A1* 5/2003 Kakarala ................ H04N 19/46 375/E7.129
2022/0321879 A1* 10/2022 Chadha ................ H04N 19/103
2022/0335560 A1* 10/2022 Yoo .......................... G06N 3/09
2023/0154055 A1* 5/2023 Besenbruch ........... G06N 3/092 375/240.03

OTHER PUBLICATIONS

Choi, J., & Han, B. (Aug. 23, 2020). Task-aware quantization network for jpeg image compression. In Computer Vision—ECCV 2020: 16th European Conference, Glasgow, UK, Proceedings, Part XX 16 (pp. 309-324). Springer International Publishing.
Esser, P., Rombach, R., & Ommer, B. (Jun. 20, 2021). Taming transformers for high-resolution image synthesis. In Proceedings of the IEEE/CVF conference on computer vision and pattern recognition (pp. 12873-12883).
Goodfellow, I. J., Shlens, J., & Szegedy, C. (Dec. 20, 2014). Explaining and harnessing adversarial examples. arXiv preprint arXiv:1412.6572.
Guo, C., Rana, M., Cisse, M., & Van Der Maaten, L. (Oct. 31, 2017). Countering adversarial images using input transformations. arXiv preprint arXiv:1711.00117.
Hataya, R., Zdenek, J., Yoshizoe, K., & Nakayama, H. (Aug. 23, 2020). Faster autoaugment: Learning augmentation strategies using backpropagation. In Computer Vision—ECCV 2020: 16th European Conference, Glasgow, UK, Proceedings, Part XXV 16 (pp. 1-16). Springer International Publishing.
He, K., Zhang, X., Ren, S., & Sun, J. (Jun. 27, 2016). Deep residual learning for image recognition. In Proceedings of the IEEE conference on computer vision and pattern recognition (pp. 770-778).
Hudson, G., Léger, A., Niss, B., Sebestyén, I., & Vaaben, J. (Jul. 1, 2018). JPEG-1 standard 25 years: past, present, and future reasons for a success. Journal of Electronic Imaging, 27(4), 040901-040901.
Hussain, A. J., Al-Fayadh, A., & Radi, N. (Jul. 26, 2018). Image compression techniques: A survey in lossless and lossy algorithms. Neurocomputing, 300, 44-69.
Jang, E., Gu, S., & Poole, B. (Nov. 3, 2016). Categorical reparameterization with gumbel-softmax. arXiv preprint arXiv:1611.01144.
Karras, T., Aittala, M., Hellsten, J., Laine, S., Lehtinen, J., & Aila, T. (Dec. 6, 2020). Training generative adversarial networks with limited data. Advances in neural information processing systems, 33, 12104-12114.
Kurakin, A., Goodfellow, I., & Bengio, S. (Nov. 4, 2016). Adversarial machine learning at scale. arXiv preprint arXiv:1611.01236.
Kurakin, A., Goodfellow, I. J., & Bengio, S. (Jul. 27, 2018). Adversarial examples in the physical world. In Artificial intelligence safety and security (pp. 99-112). Chapman and Hall/CRC.
Luo, X., Talebi, H., Yang, F., Elad, M., & Milanfar, P. (Aug. 3, 2020). The rate-distortion-accuracy tradeoff: Jpeg case study. arXiv preprint arXiv:2008.00605.
Papamakarios, G., Nalisnick, E., Rezende, D. J., Mohamed, S., & Lakshminarayanan, B. (Mar. 2021). Normalizing flows for probabilistic modeling and inference. Journal of Machine Learning Research, 22(57), 1-64.
Paszke, A., Gross, S., Massa, F., Lerer, A., Bradbury, J., Chanan, G., . . . & Chintala, S. (Dec. 8, 2019). Pytorch: An imperative style, high-performance deep learning library. Advances in neural information processing systems, 32.
Riba, E., Mishkin, D., Ponsa, D., Rublee, E., & Bradski, G. (Jun. 13, 2020). Kornia: an open source differentiable computer vision library for pytorch. In Proceedings of the IEEE/CVF Winter Conference on Applications of Computer Vision (pp. 3674-3683).
Russakovsky, O., Deng, J., Su, H., Krause, J., Satheesh, S., Ma, S., . . . & Fei-Fei, L. (Dec. 2015). Imagenet large scale visual recognition challenge. International journal of computer vision, 115, 211-252.
Shi, J., Riba, E., Mishkin, D., Moreno, F., & Nicolaou, A. (Nov. 19, 2020). Differentiable data augmentation with Kornia. arXiv preprint arXiv:2011.09832.
Shin, R., & Song, D. (Dec. 4, 2017). Jpeg-resistant adversarial images. In NIPS 2017 workshop on machine learning and computer security (vol. 1, p. 8).
Shorten, C., & Khoshgoftaar, T. M. (Dec. 2019). A survey on image data augmentation for deep learning. Journal of big data, 6(1), 1-48.
Shu, M., Shen, Y., Lin, M. C., & Goldstein, T. (May 30, 2021). Adversarial differentiable data augmentation for autonomous systems. In 2021 IEEE International Conference on Robotics and Automation (ICRA) (pp. 14069-14075). IEEE.
Strümpler, Y., Yang, R., & Timofte, R. (Aug. 23, 2020). Learning to improve image compression without changing the standard decoder. In European Conference on Computer Vision (pp. 200-216). Cham: Springer International Publishing.
Theis, L., Shi, W., Cunningham, A., & Huszár, F. (Jul. 21, 2022). Lossy image compression with compressive autoencoders. In International conference on learning representations.
Van Den Oord, A., & Vinyals, O. (Dec. 4, 2017). Neural discrete representation learning. Advances in neural information processing systems, 30.
Wallace, G. K. (Apr. 1, 1991). The JPEG still picture compression standard. Communications of the ACM, 34(4), 30-44.
Wang, Z., Bovik, A. C., Sheikh, H. R., & Simoncelli, E. P. (Apr. 13, 2004). Image quality assessment: from error visibility to structural similarity. IEEE transactions on image processing, 13(4), 600-612.
Xie, X., Zhou, N., Zhu, W., & Liu, J. (Oct. 23, 2022). Bandwidth-Aware Adaptive Codec for DNN Inference Offloading in IoT. In European Conference on Computer Vision (pp. 88-104). Cham: Springer Nature Switzerland.
Xing, Y., Qian, Z., & Chen, Q. (Jun. 19, 2021). Invertible image signal processing. In Proceedings of the IEEE/CVF Conference on Computer Vision and Pattern Recognition (pp. 6287-6296).
Yang, Y., Liang, C., He, H., Cao, X., & Gong, N. Z. (Sep. 13, 2021). Faceguard: Proactive deepfake detection. arXiv preprint arXiv:2109.05673.
Zeyde, R., Elad, M., & Protter, M. (Jun. 24, 2012). On single image scale-up using sparse-representations. In Curves and Surfaces: 7th International Conference, Avignon, France, Revised Selected Papers 7 (pp. 711-730). Springer Berlin Heidelberg.
Zhang, C., Karjauv, A., Benz, P., & Kweon, I. S. (Dec. 30, 2020). Towards robust data hiding against (jpeg) compression: A pseudo-differentiable deep learning approach. arXiv preprint arXiv:2101.00973.
Zhao, S., Liu, Z., Lin, J., Zhu, J. Y., & Han, S. (Dec. 6, 2020). Differentiable augmentation for data-efficient gan training. Advances in neural information processing systems, 33, 7559-7570.
Zhu, J., Kaplan, R., Johnson, J., & Fei-Fei, L. (Sep. 8, 2018). Hidden: Hiding data with deep networks. In Proceedings of the European conference on computer vision (ECCV) (pp. 657-672).

* cited by examiner

ENCODING AND DECODING IMAGES USING DIFFERENTIABLE JPEG COMPRESSION

RELATED APPLICATION INFORMATION

This application claims priority to U.S. Provisional App. No. 63/523,508, filed on Jun. 27, 2023, and U.S. Provisional App. No. 63/535,381, filed on Aug. 30, 2023, the contents of each of which are incorporated herein by reference in their entirety.

BACKGROUND

Technical Field

The present invention relates to image compression and processing, and more particularly to a system and method for encoding and decoding images using differentiable Joint Photographic Experts Group (JPEG) compression to facilitate efficient storage and transmission of comparatively high-quality images by optimizing a balance between compression efficiency and image fidelity for various applications and network environments.

Description of the Related Art

In the field of digital image compression and processing, conventional systems and methods utilize fixed algorithms such as the standard JPEG compression, which involves a series of non-differentiable steps including color space conversion, discrete cosine transformation, quantization, and entropy coding. These conventional systems and methods, while they can be effective for reducing file sizes, face limitations in adaptively optimizing compression settings for various applications and network conditions. Indeed, existing systems and methods struggle with balancing the trade-off between compression efficiency and image quality, particularly when integrating with modern machine learning workflows that require differentiable operations for gradient-based optimization. Furthermore, conventional JPEG compression techniques are not designed to seamlessly incorporate into deep learning pipelines, thereby posing challenges in applications requiring both comparatively high compression efficiency and integration with neural networks for tasks such as, for example, image recognition, enhancement, real-time transmission, and others. This underscores the need for innovative solutions that can provide differentiable, high-efficiency image compression adaptable to diverse application requirements while maintaining compatibility with advanced machine learning methodologies.

SUMMARY

According to an aspect of the present invention, a method is provided for encoding and decoding images using differentiable Joint Photographic Experts Group (JPEG) compression, including converting an image from a Red-Green-Blue (RGB) color space to a Luminance-Chrominance (YCbCr) color space to obtain luminance channels and chrominance channels, and applying chroma subsampling to the chrominance channels to reduce resolution. The YCbCr image is divided into pixel blocks and a discrete cosine transform (DCT) is performed on each of the pixel blocks to obtain DCT coefficients. The DCT coefficients are quantized using a scaled quantization table to reduce precision. The quantized DCT coefficients are encoded using lossless entropy coding, forming a compressed JPEG file decoded by reversing the lossless entropy coding to obtain quantized DCT coefficients, which are dequantized using the scaled quantization table to restore the precision. An inverse discrete cosine transform (IDCT) is applied to the dequantized DCT coefficients to convert the dequantized DCT coefficients back to a spatial domain. The chrominance channels are upsampled to original resolution, and the YCbCr image is converted back to the RGB color space.

According to another aspect of the present invention, a system is provided for encoding and decoding images using differentiable Joint Photographic Experts Group (JPEG) compression. The system includes a memory storing instructions that when executed by a processor device, cause the system to convert an image from a Red-Green-Blue (RGB) color space to a Luminance-Chrominance (YCbCr) color space to obtain luminance channels and chrominance channels, and apply chroma subsampling to the chrominance channels to reduce resolution. The YCbCr image is divided into pixel blocks and a discrete cosine transform (DCT) is performed on each of the pixel blocks to obtain DCT coefficients. The DCT coefficients are quantized using a scaled quantization table to reduce precision. The quantized DCT coefficients are encoded using lossless entropy coding, forming a compressed JPEG file decoded by reversing the lossless entropy coding to obtain quantized DCT coefficients, which are dequantized using the scaled quantization table to restore the precision. An inverse discrete cosine transform (IDCT) is applied to the dequantized DCT coefficients to convert the dequantized DCT coefficients back to a spatial domain. The chrominance channels are upsampled to original resolution, and the YCbCr image is converted back to the RGB color space.

According to another aspect of the present invention, a computer program product is provided for encoding and decoding images using differentiable Joint Photographic Experts Group (JPEG) compression, including converting an image from a Red-Green-Blue (RGB) color space to a Luminance-Chrominance (YCbCr) color space to obtain luminance channels and chrominance channels, and applying chroma subsampling to the chrominance channels to reduce resolution. The YCbCr image is divided into pixel blocks and a discrete cosine transform (DCT) is performed on each of the pixel blocks to obtain DCT coefficients. The DCT coefficients are quantized using a scaled quantization table to reduce precision. The quantized DCT coefficients are encoded using lossless entropy coding, forming a compressed JPEG file decoded by reversing the lossless entropy coding to obtain quantized DCT coefficients, which are dequantized using the scaled quantization table to restore the precision. An inverse discrete cosine transform (IDCT) is applied to the dequantized DCT coefficients to convert the dequantized DCT coefficients back to a spatial domain. The chrominance channels are upsampled to original resolution, and the YCbCr image is converted back to the RGB color space.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Figure 1:
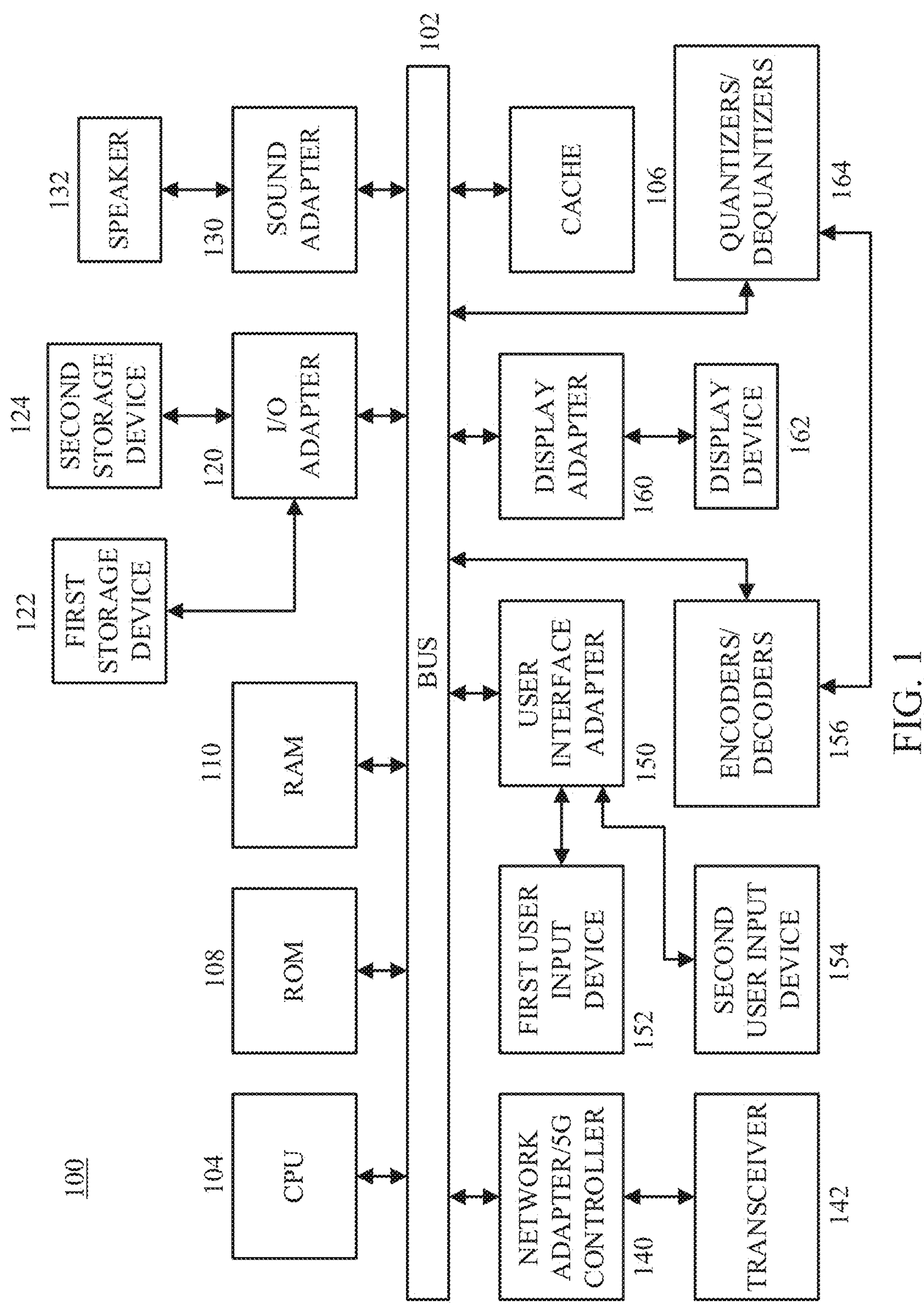
FIG. 1 is a block diagram illustratively depicting an exemplary processing system to which the present invention may be applied, in accordance with embodiments of the present invention.

In accordance with embodiments of the present invention, systems and methods are provided for encoding and decoding images using differentiable Joint Photographic Experts Group (JPEG) compression, which efficiently optimizes image storage and transmission while maintaining comparatively high image quality. A purpose of this invention is to enhance traditional JPEG compression techniques by incorporating differentiable operations that can be integrated into machine learning workflows, enabling gradient-based optimization and seamless integration with neural networks.

In various embodiments, the system and method of the present invention can convert images from the Red-Green-Blue (RGB) color space to the Luminance-Chrominance (YCbCr) color space, apply chroma subsampling to reduce chrominance resolution, and divide the YCbCr image into pixel blocks for discrete cosine transform (DCT) processing. By quantizing the DCT coefficients using a scaled quantization table based on a JPEG quality parameter, the present invention can balance compression efficiency and image fidelity. The encoded images can be then subjected to lossless entropy coding to generate compressed JPEG files, which can be decoded by reversing these steps. Dequantizing the DCT coefficients and applying an inverse DCT can restore the image to the spatial domain, and can be followed by upsampling the chrominance channels and converting the image back to the RGB color space, in accordance with aspects of the present invention.

The present invention can integrate differentiable approximations of non-differentiable operations (e.g., the floor function used in quantization scaling, etc.), allowing for efficient, accurate, and smooth gradient propagation. This enables the system and method of the present invention to be effectively utilized in various applications requiring real-time image processing, high compression efficiency, and integration with deep learning frameworks. The invention's adaptability makes it suitable for a wide range of practical applications, including, for example, medical imaging, industrial monitoring, satellite communications, smart city infrastructure, etc., ensuring robust and scalable image compression solutions across different domains, in accordance with aspects of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems, and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods, and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. One or more encoders and/or decoders 156 can be utilized in conjunction with one or more quantizers and/or dequantizers 164 for encoding, decoding, quantizing, and/or dequantizing, and can be further coupled to system bus 102 by any appropriate connection system or method (e.g., Wi-Fi, wired, network adapter, etc.), in accordance with aspects of the present invention.

A first user input device 152 and a second user input device 154 are operatively coupled to system bus 102 by user interface adapter 150. The user input devices 152, 154 can be one or more of any of a keyboard, a mouse, a keypad, an image capture device, a motion sensing device, a microphone, a device incorporating the functionality of at least two of the preceding devices, and so forth. The encoders and/or decoders 156 can be utilized to encode and/or decode any types of received images, and can be included in a system with one or more storage devices, communication/networking devices (e.g., WiFi, 4G, 5G, Wired connectivity), hardware processors, etc., in accordance with aspects of the present invention. In various embodiments, other types of input devices can also be used, while maintaining the spirit of the present principles. The user input devices 152, 154 can be the same type of user input device or different types of user input devices. The user input devices 152, 154 are used to input and output information to and from system 100, in accordance with aspects of the present invention. The encoders and/or decoders 156 can be utilized to work in conjunction with the quantizers and/or dequantizers 164, in addition to other system components, which can be operatively connected to the system 100 for any of a plurality of tasks (e.g., encoding and decoding images using differentiable Joint Photographic Experts Group (JPEG) compression), in accordance with aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 400, 600, and 700, described below with respect to FIGS. 4, 6, and 7, respectively, are systems for implementing respective embodiments of the present invention. Part or all of processing system 100 may be implemented in one or more of the elements of systems 400, 600, and 700, in accordance with aspects of the present invention.

Further, it is to be appreciated that processing system 100 may perform at least part of the methods described herein including, for example, at least part of methods 200, 300, 400, 500, and 600, described below with respect to FIGS. 2, 3, 4, 5, and 6, respectively. Similarly, part or all of systems 400, 600, and 700 may be used to perform at least part of methods 200, 300, 400, 500, and 600 of FIGS. 2, 3, 4, 5, and 6, respectively, in accordance with aspects of the present invention.

As employed herein, the term "hardware processor subsystem," "processor," or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs). These and other variations of a hardware processor subsystem are also contemplated in accordance with embodiments of the present invention.

Figure 2:
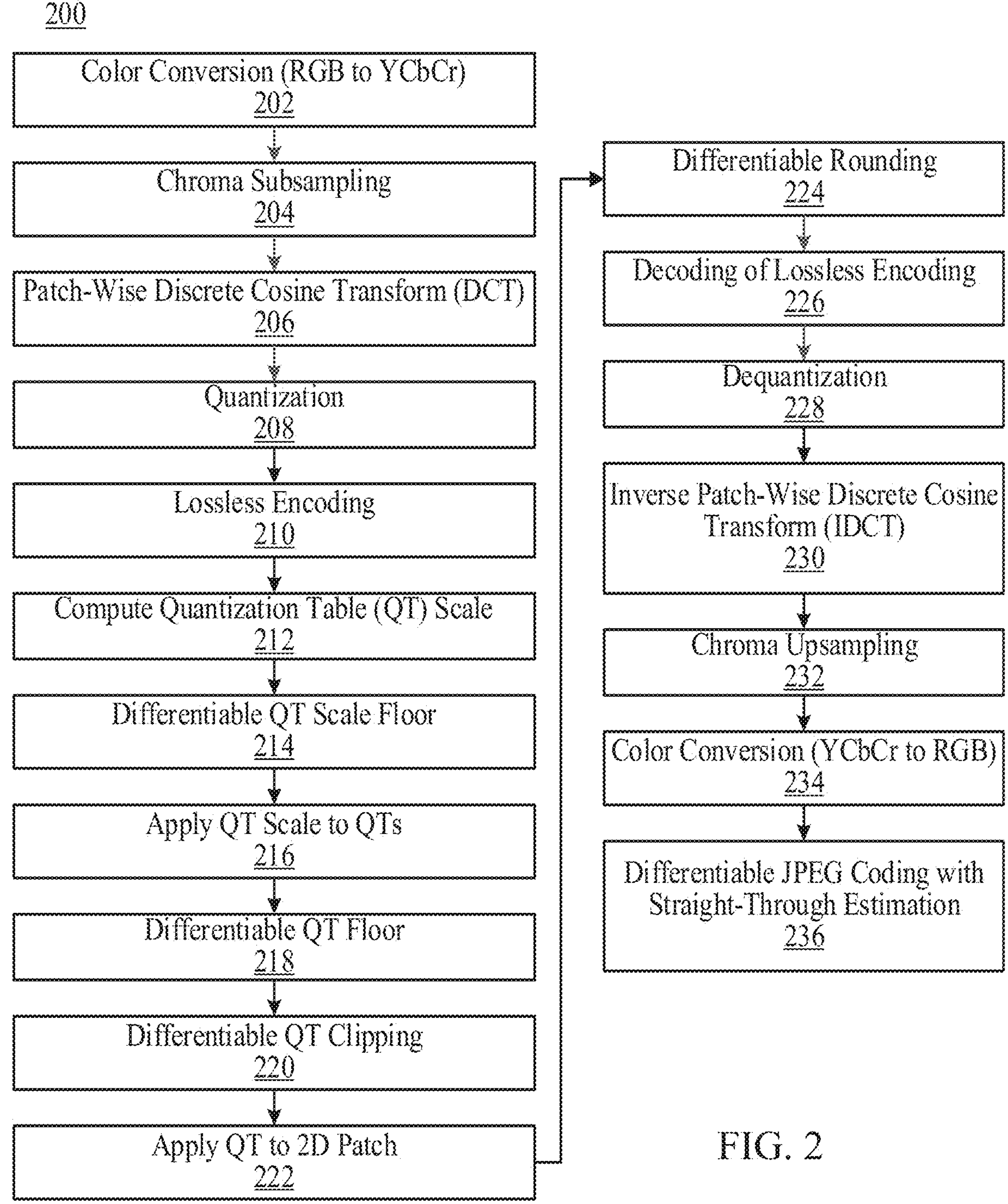
FIG. 2 is a diagram illustratively depicting a method for differentiable Joint Photographic Experts Group (JPEG) encoding and decoding, in accordance with embodiments of the present invention.

Referring now to FIG. 2, a diagram showing a method 200 for differentiable Joint Photographic Experts Group (JPEG) encoding and decoding, is illustratively depicted in accordance with embodiments of the present invention.

In various embodiments, in block 202, color conversion from the RGB color space to the YCbCr color space can be performed. Digital images are typically displayed in the RGB color space, which uses Red, Green, and Blue (RGB) channels. The JPEG standard employs the YCbCr color space for compression because it separates luminance (brightness) from chrominance (color) information. This conversion is executed through a pixel-wise affine transformation. The luminance channel (Y) represents brightness, while the chrominance channels (Cb and Cr) contain color information. This transformation allows for more efficient compression by prioritizing the luminance information, which the human eye is more sensitive to.

In block 204, chroma subsampling can be applied to reduce the resolution of the chrominance channels. Since the human eye is less sensitive to color details compared to brightness, chroma subsampling reduces the data size by downsampling the chrominance channels (Cb and Cr). Typically, a 4:2:0 subsampling pattern is used, which reduces the chroma resolution by half in both horizontal and vertical dimensions. This process involves an anti-aliasing operation (such as a 2D convolution) followed by standard downsampling, thus saving storage space and processing power without significantly affecting perceived image quality.

In block 206, a patch-wise discrete cosine transform (DCT) can be applied to convert the spatial image data into the frequency domain. The image is divided into 8×8 pixel blocks, and each block is independently transformed using the DCT. This step changes the image data from the spatial domain to the frequency domain, where the energy of the image is concentrated into fewer coefficients, especially at lower frequencies. These DCT coefficients represent the image in terms of its frequency components, which can be more efficiently compressed. In block 208, quantization can be performed on the DCT coefficients to achieve lossy compression. Quantization involves reducing the precision of the DCT coefficients by dividing them by predetermined values from a quantization table and rounding the results. This process discards less perceptually significant information, reducing the amount of data needed to store the image. The degree of quantization is controlled by a quality parameter, which scales the quantization table. Lower quality settings result in higher compression and more information loss, while higher quality settings retain more image detail with less compression.

In block 210, the quantized DCT coefficients can be encoded using lossless entropy coding methods. JPEG employs a combination of run-length encoding and Huffman coding to compress the quantized coefficients without further loss of information. Run-length encoding efficiently compresses sequences of zero coefficients, and Huffman coding assigns shorter codes to more frequent values. The final JPEG file includes the compressed image data, the quantization tables, and other necessary metadata for decoding. In block 212, the scale factor for the quantization table can be computed based on the JPEG quality parameter. The scale factor adjusts the values in the quantization table according to the desired quality, balancing compression and image quality. Higher quality settings result in a finer scale, preserving more image detail but producing larger file sizes, while lower quality settings increase compression at the cost of more significant detail loss.

In block 214, a differentiable approximation of the floor function can be applied to the scaled quantization table. The standard JPEG process uses integer arithmetic to scale the quantization table, effectively applying a floor function. For a differentiable JPEG approach, this floor function is approximated in a manner that allows gradients to propagate smoothly. This approximation ensures that the quantization scaling step is compatible with gradient-based optimization methods used in deep learning. In block 216, the computed scale factor can be applied to the standard quantization tables. This scaling adjusts the quantization tables to match the desired quality setting. After scaling, the tables are used in the quantization step to determine how much information to discard, thus controlling the compression level.

In block 218, the scaled quantization tables can be adjusted to ensure they contain integer values, as required by the JPEG standard. This step typically involves applying the floor function. In a differentiable JPEG approach, a smooth approximation of this function is used to maintain gradient flow. This ensures that the quantization tables used in the encoding process can be seamlessly integrated into gradient-based learning frameworks. In block 220, the quantization table values can be clipped to remain within the standard integer range required by JPEG, typically 1 to 255. This step ensures that the quantization tables comply with JPEG standards even when scaled for different quality settings. A differentiable soft clipping function is used to maintain non-zero gradients, which is crucial for backpropagation in machine learning applications.

In block 222, the scaled and adjusted quantization table can be applied to each 8×8 DCT patch of the image. This involves dividing each DCT coefficient by the corresponding value in the quantization table and rounding the result. This step compresses the image data by reducing the precision of the DCT coefficients, making the data more suitable for efficient storage. In block 224, the rounding operation used during quantization can be approximated in a differentiable manner. Instead of using a standard rounding function, which is not differentiable, a smooth approximation is used. This ensures that gradients can propagate through the rounding step, allowing the entire JPEG encoding process to be integrated into gradient-based optimization frameworks.

In block 226, the lossless encoded JPEG file can be decoded. This step involves reversing the Huffman and run-length encoding to recover the quantized DCT coefficients. The data is then rearranged from the zigzag order back into 8×8 blocks, preparing it for dequantization and inverse DCT. In block 228, the quantized DCT coefficients can be dequantized by multiplying them with the respective scaled quantization table values. This step reverses the quantization process, restoring the DCT coefficients to their original range but with reduced precision, ready for the inverse DCT to convert back to the spatial domain. In block 230, the inverse DCT can be applied to convert the frequency domain data back into the spatial domain. Each 8×8 block of DCT coefficients is transformed back into pixel values, reconstructing the image blocks. This step reverses the DCT process and restores the image data to its spatial representation.

In block 232, chroma upsampling can be performed to restore the original resolution of the chrominance channels. This process involves upsampling the Cb and Cr channels, typically using bilinear interpolation, to match the resolution of the luminance channel. This step reverses the chroma subsampling and ensures that the chrominance information aligns with the luminance data. In block 234, the image can be converted from the YCbCr color space back to the RGB color space. This is done by applying the inverse of the initial color transformation. The restored RGB image is then ready for display or further processing. This conversion reintroduces the color information into the final image, completing the JPEG decoding process.

In block 236, the differentiable JPEG coding process can be enhanced using the straight-through estimator (STE) technique. This involves using the true rounding, floor, and clipping functions during the forward pass while employing the gradients of the differentiable approximations during backpropagation. The STE technique ensures accurate forward function behavior while maintaining smooth gradients for optimization. This approach is particularly beneficial for integrating JPEG coding into machine learning pipelines, where accurate gradient information is crucial for training and optimization, in accordance with aspects of the present invention.

Figure 3:
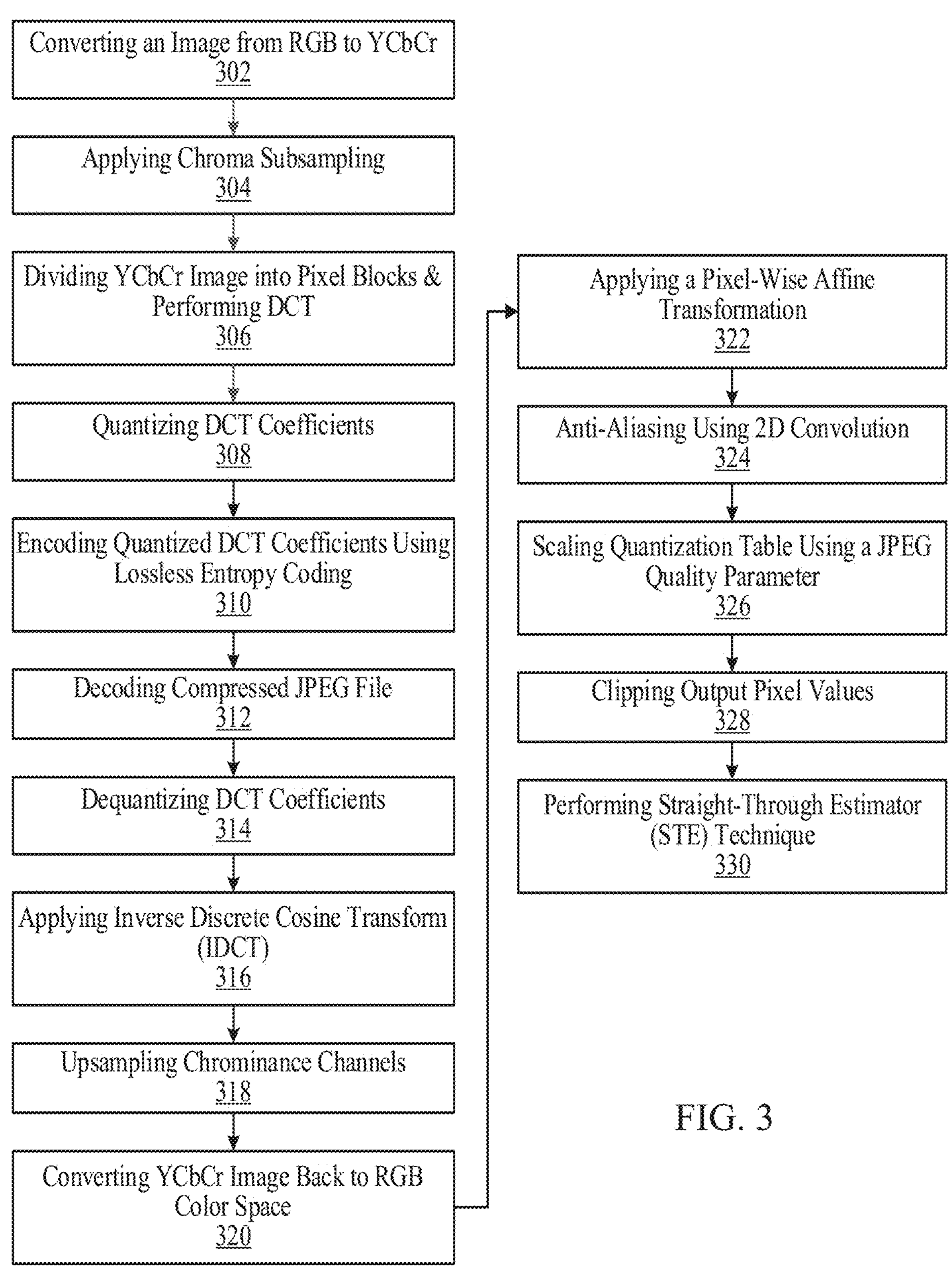
FIG. 3 is a diagram illustratively depicting a method for encoding and decoding images using differentiable Joint Photographic Experts Group (JPEG) compression, including color conversion, quantization, and dequantization, in accordance with embodiments of the present invention.

Referring now to FIG. 3, a diagram showing a method 300 for encoding and decoding images using differentiable Joint Photographic Experts Group (JPEG) compression, including color conversion, quantization, and dequantization, is illustratively depicted in accordance with embodiments of the present invention.

In various embodiments, in block 302, an image can be converted from the Red-Green-Blue (RGB) color space to the Luminance-Chrominance (YCbCr) color space. This conversion can involve separating the image into a luminance channel (Y) representing brightness and two chrominance channels (Cb and Cr) representing color information. The process can use a pixel-wise affine transformation to ensure that the resulting YCbCr channels accurately reflect the original RGB image. This transformation is beneficial for compression because the human eye is more sensitive to luminance than to chrominance, allowing for more efficient encoding.

In block 304, chroma subsampling can be applied to the chrominance channels (Cb and Cr) to reduce their resolution. Chroma subsampling leverages the fact that the human eye is less sensitive to color details compared to brightness. The process can involve anti-aliasing using a two-dimensional (2D) convolution followed by downsampling. This operation can significantly reduce the amount of data needed to represent the chrominance channels, thereby enhancing compression efficiency without markedly affecting perceived image quality. In block 306, the YCbCr image can be divided into non-overlapping 8×8 pixel blocks, and a discrete cosine transform (DCT) can be performed on each block. This process transforms the image data from the spatial domain to the frequency domain. The DCT coefficients generated in this step represent the image in terms of its frequency components, concentrating energy in a few significant coefficients and making it easier to compress the image data effectively.

In block 308, the DCT coefficients can be quantized using a scaled quantization table. Quantization involves reducing the precision of the DCT coefficients by dividing them by values from the quantization table and rounding the results. The scale factor for the quantization table can be computed based on a JPEG quality parameter, which allows for controlling the trade-off between image quality and file size. A lower quality parameter results in higher compression and greater information loss, while a higher quality parameter preserves more detail with less compression. In block 310, the quantized DCT coefficients can be encoded using lossless entropy coding methods. This step can include arranging the coefficients in a zigzag order to group low-frequency coefficients together, performing run-length encoding to compress sequences of zero coefficients, and applying Huffman coding to generate a binary JPEG file. The resulting compressed JPEG file contains the encoded image data, along with necessary metadata such as quantization tables and image dimensions.

In block 312, the compressed JPEG file can be decoded by reversing the lossless entropy coding to obtain the quantized DCT coefficients. This process involves undoing the Huffman coding and run-length encoding to retrieve the quantized coefficients, which are then reorganized into their original 8×8 block format. This step prepares the data for subsequent dequantization and inverse transformation processes. In block 314, the quantized DCT coefficients can be dequantized using the scaled quantization table. Dequantization involves multiplying the quantized coefficients by the corresponding values in the quantization table to restore their precision. This process reverses the quantization step, enabling the reconstruction of the original frequency components of the image.

In block 316, an inverse discrete cosine transform (IDCT) can be applied to the dequantized DCT coefficients to convert them back to the spatial domain. This step reconstructs the pixel values from the frequency domain data, effectively restoring the image blocks to their original appearance before compression. The IDCT process is crucial for transforming the compressed data back into a viewable image format. In block 318, the chrominance channels (Cb and Cr) can be upsampled to their original resolution. This process involves increasing the resolution of the chrominance channels using techniques such as bilinear interpolation to match the resolution of the luminance channel. Upsampling restores the color detail that was reduced during chroma subsampling, ensuring that the final image maintains its visual quality.

In block 320, the YCbCr image can be converted back to the RGB color space. This step involves applying the inverse of the initial affine transformation to combine the luminance and chrominance channels back into a single RGB image. The conversion ensures that the final image is in a standard color space suitable for display or further processing. In block 322, a pixel-wise affine transformation can be applied during the conversion from RGB to YCbCr color space. This transformation adjusts each pixel value to separate the luminance and chrominance information accurately. The pixel-wise affine transformation is essential for maintaining the fidelity of the color information during the color space conversion process.

In block 324, anti-aliasing can be applied using a two-dimensional (2D) convolution as part of the chroma subsampling process. Anti-aliasing helps to smooth out high-frequency components before downsampling, reducing the risk of aliasing artifacts. The 2D convolution operation can improve the quality of the subsampled chrominance channels by preserving important color information while discarding less significant details. In block 326, the quantization table can be scaled using a factor computed based on the JPEG quality parameter. The scaling process adjusts the quantization table values according to the desired image quality, balancing the trade-off between compression efficiency and visual fidelity. The scaling can involve a differentiable approximation of a floor function to ensure that the process is compatible with gradient-based optimization methods.

In block 328, the output pixel values can be clipped during the decoding process to ensure they remain within a valid range. Clipping helps to prevent pixel values from exceeding the allowable limits, which can cause visual artifacts in the final image. This step ensures that the decoded image maintains its visual integrity and complies with standard pixel value ranges. In block 330, a straight-through estimator (STE) technique can be used during the encoding and decoding steps to ensure accurate gradient propagation for machine learning applications. The STE technique allows for the use of non-differentiable operations during the forward pass while maintaining differentiability during the backward pass. This approach ensures that the JPEG compression process can be integrated into gradient-based optimization frameworks, such as those used in deep learning, enhancing the applicability of the method in advanced computational tasks, in accordance with aspects of the present invention.

Figure 4:
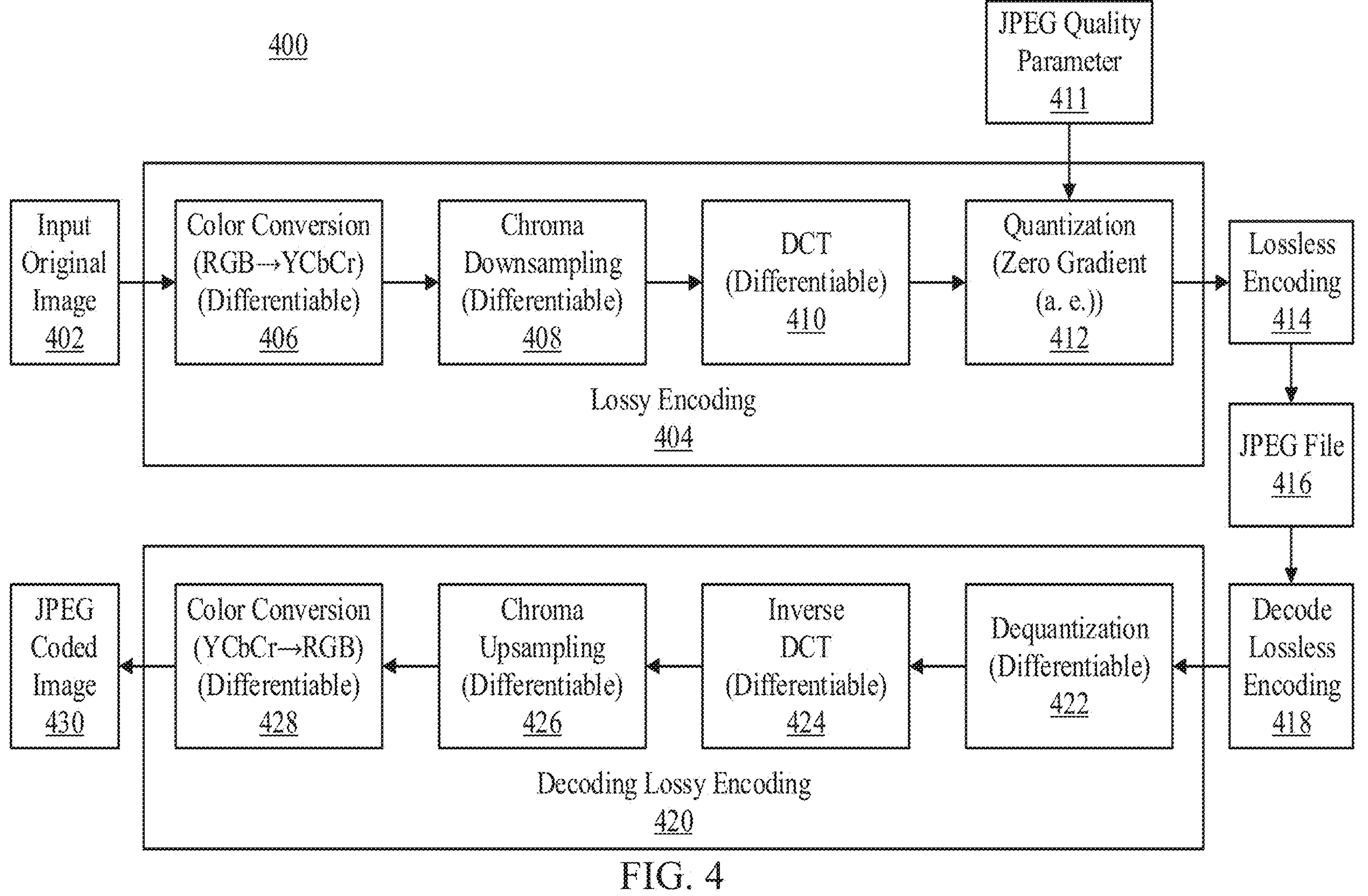
FIG. 4 is a diagram illustratively depicting a system and method for encoding and decoding images using differentiable Joint Photographic Experts Group (JPEG) compression, including color conversion, quantization, and dequantization, in accordance with embodiments of the present invention.

Referring now to FIG. 4, a diagram showing a system and method 400 for encoding and decoding images using differentiable Joint Photographic Experts Group (JPEG) compression, including color conversion, quantization, and dequantization, is illustratively depicted in accordance with embodiments of the present invention. The system and method 400 for encoding and decoding images using differentiable Joint Photographic Experts Group (JPEG) compression can facilitate efficient image storage and transmission while maintaining high image quality. It can integrate processes for converting color spaces, downsampling chroma channels, performing discrete cosine transforms (DCT), quantizing coefficients, encoding and decoding the data, dequantizing, and reverting the images to the original color space. The entire system can leverage differentiable approximations to ensure smooth gradient propagation, making it compatible with machine learning applications.

Initially it is noted that the conventional JPEG compression standard can use both lossy and lossless coding to achieve efficient image compression. The encoding starts by converting the original RGB image to the YCbCr color space and performing chroma downsampling. The YCbCr channels are then transformed into the frequency domain using a patch-wise discrete cosine transform (DCT). A given JPEG quality controls the quantization strength of the DCT features, trading file-size against distortion. Finally, the compressed JPEG file is produced using lossless coding. During decoding, the lossless and lossy encoding steps are reversed to reconstruct the JPEG-coded image from the JPEG file. In general, JPEG encoding-decoding can be seen as a function mapping from an original (raw) RGB image I and the JPEG quality q to the JPEG-coded (distorted) image Î:

$$JPEG(I, q) = \hat{I},\ q \in \{1, 2, \ldots, 99\},$$

H and W can be utilized to denote image resolution, and some embodiments can consider a max q of 100, others of 99, etc., and for illustrative purposes, we use 99 as max q herein below.

In various embodiments, in block 402, an original image in the Red-Green-Blue (RGB) color space can be input into the system. This image can serve as the starting point for the encoding process. The image data can be received from various sources such as digital cameras, scanners, or image repositories. The input image can undergo several transformations to prepare it for efficient compression, leveraging the system's capability to handle large volumes of data while maintaining high fidelity. In block 404, the system can perform lossy encoding of the input image. This process can involve multiple sub-steps that transform the image into a compressed format suitable for storage or transmission. Each sub-step can be designed to progressively reduce the amount of data needed to represent the image while maintaining as much visual quality as possible.

In block 406, the system can convert the input image from the RGB color space to the YCbCr color space. This conversion can separate the image into luminance (Y) and chrominance (Cb and Cr) channels. The color conversion process can include a pixel-wise affine transformation, which can be differentiable to allow gradient propagation. By transforming the image into the YCbCr color space, the system can take advantage of the human visual system's greater sensitivity to luminance variations, enabling more effective compression. In block 408, the chrominance channels (Cb and Cr) can be downsampled to reduce their resolution. Chroma downsampling can leverage the fact that the human eye is less sensitive to color details than to brightness details. The process can involve anti-aliasing using a two-dimensional (2D) convolution followed by downsampling. The downsampling operation can be differentiable, allowing it to be integrated into machine learning pipelines. The human eye is generally more sensitive to variations in brightness than to color details. This motivates the use of chroma subsampling in JPEG. By discarding less relevant information to the human eye, chroma subsampling introduces a minimal loss in perceptual quality while leading to compression. Chroma subsampling is typically implemented by an anti-aliasing operation (e.g., 2D convolution) followed by standard downsampling and is applied to both chroma channels (Ch&Cr).

In block 410, a discrete cosine transform (DCT) can be applied to the YCbCr image, which has been divided into non-overlapping 8×8 pixel blocks. The DCT can transform the spatial domain data into the frequency domain, concentrating the energy into a few significant coefficients. This transformation can be differentiable, facilitating the propagation of gradients through the compression pipeline. The DCT can be particularly useful for separating image data into frequency components, making it comparatively easier to compress than with conventional systems and methods. JPEG compression utilizes a patch-wise (and channel-wise) DCT-II operation to transform an image into a frequency (DCT) space. Before applying the DCT, non-overlapping 8×8 patches from the chroma-subsampled YCbCr image are extracted. For a given (flatten) patch p E $\{0, 1, \ldots, 255\}^{64}$ the DCT is described by $\hat{p} = a \odot Gp$. $\odot$ denotes the Hadamard product, $G \in R^{64\times64}$ contains the DCT coefficients, and a is a scaling factor. G is computed by $$G_{8u+v,8i+j} = \cos\left(\frac{2x+1}{16}\right)\cos\left(\frac{2y+1}{16}\right) \text{ and a by } a_{8u+v} = \frac{1}{4}\alpha(u)\alpha(v) \text{ with}$$

-continued $$\alpha(u) = \begin{cases} \frac{1}{\sqrt{2}} & \text{if } u = 0 \\ 1 & \text{otherwise} \end{cases} \quad \text{and } u, v, i, j \in \{0, 1, \ldots, 7\},$$

where $\hat{p} \in R^{64}$ represents the transformed patch. For simplicity of illustration, we omit the channel (YCbCr) and patch indexing in this figure.

In block 411, the JPEG quality parameter can be input into the system to control the level of compression applied during the quantization step. The quality parameter can determine the trade-off between the compression rate and the resulting image quality. A higher quality value can result in less aggressive compression, preserving more image details, while a lower quality value can increase compression at the expense of some image quality.

In block 412, the DCT coefficients can be quantized using a quantization table that is scaled based on the JPEG quality parameter. Quantization can reduce the precision of the DCT coefficients by dividing them by the quantization table values and rounding the results. This step can introduce controlled loss of information to achieve data compression. The notation "Zero Gradient (a.e.)" indicates that the gradients are zero "almost everywhere" during the quantization process. This means that while the function is mostly non-differentiable due to rounding, a differentiable approximation is employed to allow gradient propagation in real-world, practical applications, ensuring compatibility with optimization algorithms. This approach enables the system to integrate with machine learning frameworks, which rely on gradient-based optimization. In some embodiments, the present invention can utilize a differentiable approximation of the quantization process to allow gradient propagation, ensuring compatibility with optimization algorithms, in accordance with aspects of the present invention.

In block 414, the quantized DCT coefficients can be further compressed using lossless entropy coding techniques such as Huffman coding and run-length encoding. These techniques can rearrange and encode the quantized coefficients to eliminate redundancy without further loss of information. This step can produce a binary JPEG file that includes the compressed image data, quantization tables, and other necessary metadata. In some embodiments, JPEG can utilize lossless entropy coding to compress all quantized DCT patches $\hat{P}$. The lossless encoding first arranges the lossy encoded patches in a zigzag order before performing run-length encoding. Finally, Huffman coding is performed to build the binary JPEG file. Note the final JPEG file includes not only the encoded image content but also the scaled quantization tables and other markers including information such as the image resolution.

It is important to note that, in some embodiments of the invention, blocks 414, 416, and 418 can be excluded if lossless encoding and decoding are not required for the specific application. This exclusion is possible because the differentiable JPEG approach focuses on making the lossy encoding and decoding steps differentiable, which are the primary components required for integrating with machine learning pipelines. In block 416, the compressed JPEG file can be generated as the output of the encoding process. This file can contain the encoded image data in a highly compressed format suitable for storage or transmission. The JPEG file can include metadata such as quantization tables and image dimensions, which are necessary for decoding the image back to its original form. In embodiments where blocks 414 and 418 are excluded, this step can be modified to store or transmit the lossy encoded data directly.

In block 418, the system can begin the decoding process by reversing the lossless entropy coding applied during encoding. This step can involve decoding the Huffman-encoded data and undoing the run-length encoding to retrieve the quantized DCT coefficients. The process can effectively prepare the data for dequantization and subsequent steps to reconstruct the image. This block can be excluded in embodiments where lossless encoding is not utilized. In block 420, the system can perform lossy decoding of the JPEG file. This process can involve multiple sub-steps that transform the compressed image data back into a viewable image format. Each sub-step can reverse the corresponding encoding step, progressively restoring the image's original quality and resolution. The Huffman-encoded JPEG file can be decoded before the run-length encoding is undone. Finally, the information can be rearranged as a pixel grid with three channels. Note that lossless encoding and decoding can be viewed as an identity mapping.

In block 422, the quantized DCT coefficients can be dequantized using the same quantization table that was applied during encoding. Dequantization can involve multiplying the quantized coefficients by the quantization table values to restore their precision. This step can reverse the quantization process and can be designed to be differentiable, allowing gradients to flow through the decoding process. To dequantize, the quantized DCT features can be multiplied with the respective scaled QT (luma or chroma table) $\tilde{P} = \overline{P} \odot \widehat{Qt}$. In block 424, an inverse discrete cosine transform (IDCT) can be applied to the dequantized DCT coefficients to convert them back from the frequency domain to the spatial domain. This transformation can reconstruct the pixel values of the image blocks, effectively reversing the DCT applied during encoding. The IDCT can be differentiable, ensuring that gradients can be propagated through this step. In some embodiments, to convert the DCT information back into pixel space, the inverse discrete cosine transform can be applied to, for example, each \$8/times 8\$ patch.

In block 426, the chrominance channels (Cb and Cr) can be upsampled to their original resolution. This process can involve increasing the resolution of the chrominance channels using techniques such as bilinear interpolation. Upsampling can restore the color detail that was reduced during chroma downsampling, ensuring that the final image maintains its visual quality. In block 428, the YCbCr image can be converted back to the RGB color space. This step can involve applying the inverse of the initial affine transformation to combine the luminance and chrominance channels back into a single RGB image. The conversion can be differentiable, allowing gradients to propagate through the entire decoding process.

In block 430, the final JPEG coded image can be output from the system. This image can have been fully decoded and reconstructed from the compressed JPEG file, returning it to a format suitable for display or further processing. The JPEG coded image can be the result of reversing the entire encoding process, ensuring comparatively high fidelity to the original input image. The system and method 400 can be utilized to ensure that the processes are differentiable, thus enabling the system and method 400 to be integrated seamlessly with machine learning pipelines and facilitate efficient image compression and decompression with gradient-based optimization capabilities, in accordance with aspects of the present invention.

Figure 5:
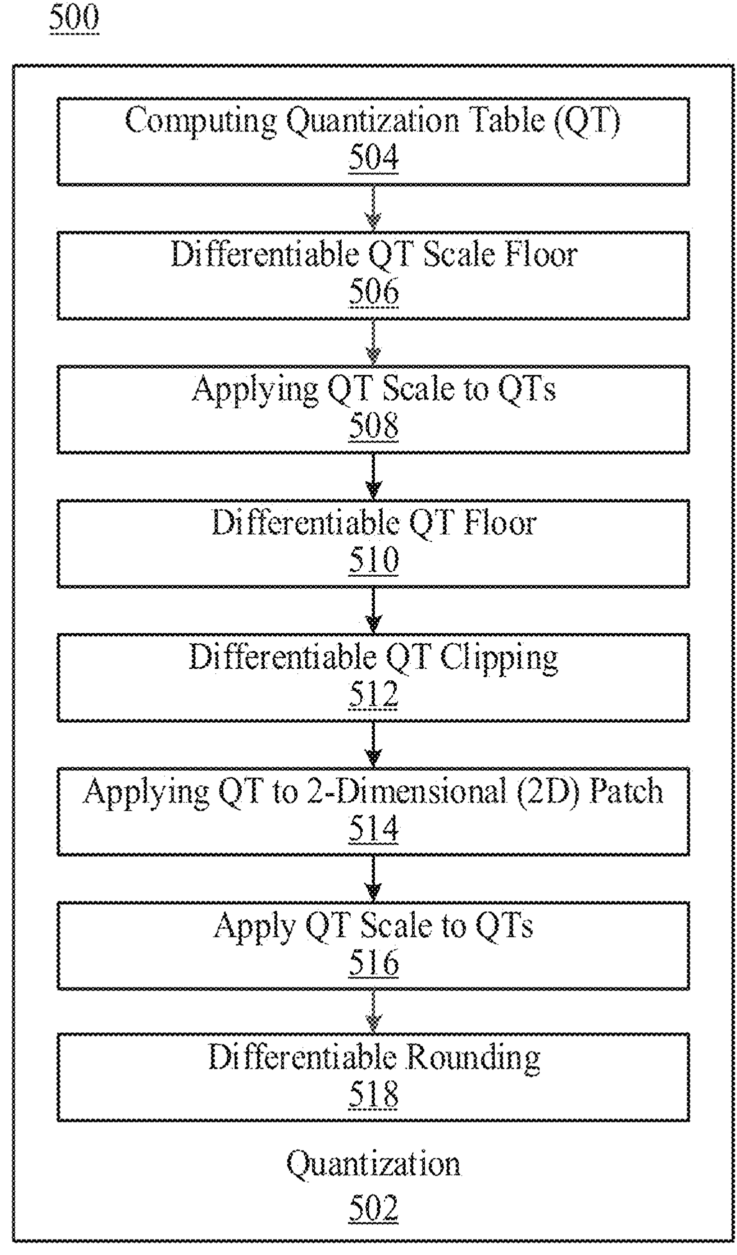
FIG. 5 is a diagram illustratively depicting a method for quantization for differentiable Joint Photographic Experts Group (JPEG) compression, in accordance with embodiments of the present invention.

Referring now to FIG. 5, with continued reference to FIG. 4, a diagram showing a method 500 for quantization for differentiable Joint Photographic Experts Group (JPEG) compression, is illustratively depicted in accordance with embodiments of the present invention. The method 500 expands on block 412 of FIG. 4 and provides a detailed view of the steps involved in quantizing the discrete cosine transform (DCT) coefficients. The workflow ensures that the quantization process is differentiable, enabling smooth gradient propagation for integration with machine learning pipelines. Each step in the workflow is carefully designed to maintain the balance between compression efficiency and image quality while allowing the entire process to be used in gradient-based optimization scenarios.

In various embodiments, in block 502, quantization can be executed, and can include reducing the precision of the DCT coefficients to compress the image data. This step is particularly useful for achieving significant data compression, making it feasible to store and transmit large images efficiently. The quantization process can be broken down into several sub-steps to ensure that it is differentiable and compatible with gradient-based optimization methods, in accordance with aspects of the present invention.

In block 504, the quantization table (QT) scale can be computed. The quantization table defines the divisors used to quantize the DCT coefficients. This table can be scaled based on the JPEG quality parameter, which determines the level of compression and image quality. The computed quantization table provides the baseline values for the subsequent scaling and quantization steps. This step ensures that the quantization process is adaptable to different quality settings, providing flexibility in the compression process. Through quantization, controlled by the JPEG quality q, frequencies are suppressed for the sake of compression. During the quantization step, the given JPEG quality q is mapped to a scale factor s by:

$$s(q) = \begin{cases} \frac{5000}{q} & \text{if } q < 50 \\ 200 - 2q & \text{otherwise} \end{cases} \quad (2)$$

A non-differentiable standard JPEG computes the quantization table scaling s(q) based on the JPEG quality with integer arithmetic (Equation 2). This is equivalent to computing s with float precision and applying the floor function. To model this operation in a differentiable manner, we introduce a differentiable floor approach.

In block 506, a differentiable approximation of the floor function can be applied to the scaled quantization table values. The floor function is typically used to convert floating-point values to integers in the standard JPEG process. However, to ensure that the process is differentiable, an approximation of the floor function is used. This approximation allows gradients to propagate through the scaling step, maintaining compatibility with gradient-based optimization algorithms. This step ensures that the quantization table values are appropriately scaled and ready for use in the quantization process. Our differentiable floor function makes use of the relation between the rounding and floor function. We can express the floor function as a shifted version of the rounding function $\lfloor x-0.5 \rceil = \lfloor x \rfloor$. Based on this property, we can use the polynomial rounding approach to approximate the floor function by $\lfloor x-0.5 \rceil + (x-0.5-\lfloor x-0.5 \rceil)^3$.

In block 508, the computed scale factor can be applied to the quantization table. This step involves scaling the quantization table values according to the JPEG quality parameter. The scaling ensures that the quantization process can be adjusted to achieve the desired balance between compression efficiency and image quality. The scaled quantization table is then used in the subsequent steps. This process allows for fine-tuning the quantization parameters based on the quality settings, providing control over the compression level. The scale factor can be applied to the (standard) quantization table $$Qt_s \in \{1, 255\}^{8\times 8} \text{ by } \hat{Q}t = \frac{sQt_s + 50}{100},$$

in accordance with aspects of the present invention.

In block 510, the quantization table values can be further processed using a differentiable approximation of the floor function. This step ensures that the quantization table values are adjusted to integer values while maintaining differentiability. The differentiable floor function allows the quantization process to be integrated into machine learning pipelines by enabling gradient propagation. This step ensures that the quantization values are compatible with standard JPEG requirements while supporting differentiable operations. Since the quantization table is included in every JPEG file, the JPEG standard requires the QT to include integer values. The standard (non-diff.) JPEG implementation ensures this by using integer arithmetic. This is equivalent to applying the floor function to QT after scaling. To ensure gradient propagation, we apply the proposed floor approximation in Step 202 to the scale QT.

In block 512, the quantization table values can be clipped to remain within the standard integer range required by JPEG (typically 1 to 255). Clipping ensures that the quantization table values comply with the JPEG standard, even when scaled for different quality settings. A differentiable clipping function is used to maintain non-zero gradients, which is crucial for backpropagation in machine learning applications. This step ensures that the quantization values do not exceed the allowable range, preserving the integrity of the compression process. Based on the JPEG standard, the quantization table can be bounded to the integer range $\{1, \ldots, 255\}^{8\times 8}$. Utilizing low JPEG qualities (strong compression) can lead to values outside of this range, even when utilizing the standard QT. To ensure values approximately within this range, we propose a differentiable (soft) clipping operation $\overline{\text{clip}}$ $$\overline{\text{clip}}(x) = \begin{cases} x & \text{if } x \in [b_{min}, b_{max}] \\ \gamma x & \text{otherwise} \end{cases}, x \in \mathbb{R}, \gamma \in (0, 1]. \quad (3)$$

This soft approximation ensures a non-zero gradient of x when outside of the range $[b_{min}, b_{max}]$. We set the scale parameter $\gamma$ to $10^{-3}$.

In block 514, the scaled and adjusted quantization table can be applied to each 8×8 DCT patch of the image. This involves dividing each DCT coefficient by the corresponding value in the quantization table and rounding the result. This step compresses the image data by reducing the precision of the DCT coefficients, making the data more suitable for efficient storage and transmission. This process ensures that the quantization is applied consistently across the entire image, maintaining uniformity in the compression. The scaled quantization table can be applied to each 2D DCT Patch $P \in \mathbb{R}^{8 \times 8}$ (reshaped $\hat{p}$) followed by the application of the rounding function $$\overline{P}_{m,n} = \left\lfloor \frac{\widehat{P_{m,n}}}{\widehat{QT_{m,n}}} \right\rceil,$$

with $m, n \in \{0, 1, \ldots, 7\}$ and $\lfloor \cdot \rceil$ denotes the rounding to the next integer.

In block 516, the final quantization table values can be applied to the DCT coefficients. This step ensures that the DCT coefficients are quantized according to the scaled and clipped quantization table values. The quantized coefficients represent the compressed image data, which can be efficiently stored or transmitted. This final application of the quantization table values ensures that the image data is fully compressed and ready for the subsequent encoding steps. In block 518, differentiable rounding can be performed for approximating the quantization operation, which can utilize the rounding function, and for illustrative purposes, we utilize the polynomial approximation $\lfloor x \rceil + (x - \lfloor x \rceil)^3$. In some embodiments, differential clipping can be applied, and similar to the input image, the output image can be bounded by the pixel range of $\{0, \ldots, 255\}$, noting that depending on the image content and the applied JPEG quality, values outside of this range can occur in accordance with aspects of the present invention. In various embodiments, the quantization 502 can be integrated into gradient-based optimization frameworks, facilitating efficient image compression and decompression with high fidelity. The detailed steps ensure that the process is robust, adaptable, and suitable for a variety of applications requiring efficient image compression, in accordance with aspects of the present invention.

Figure 6:
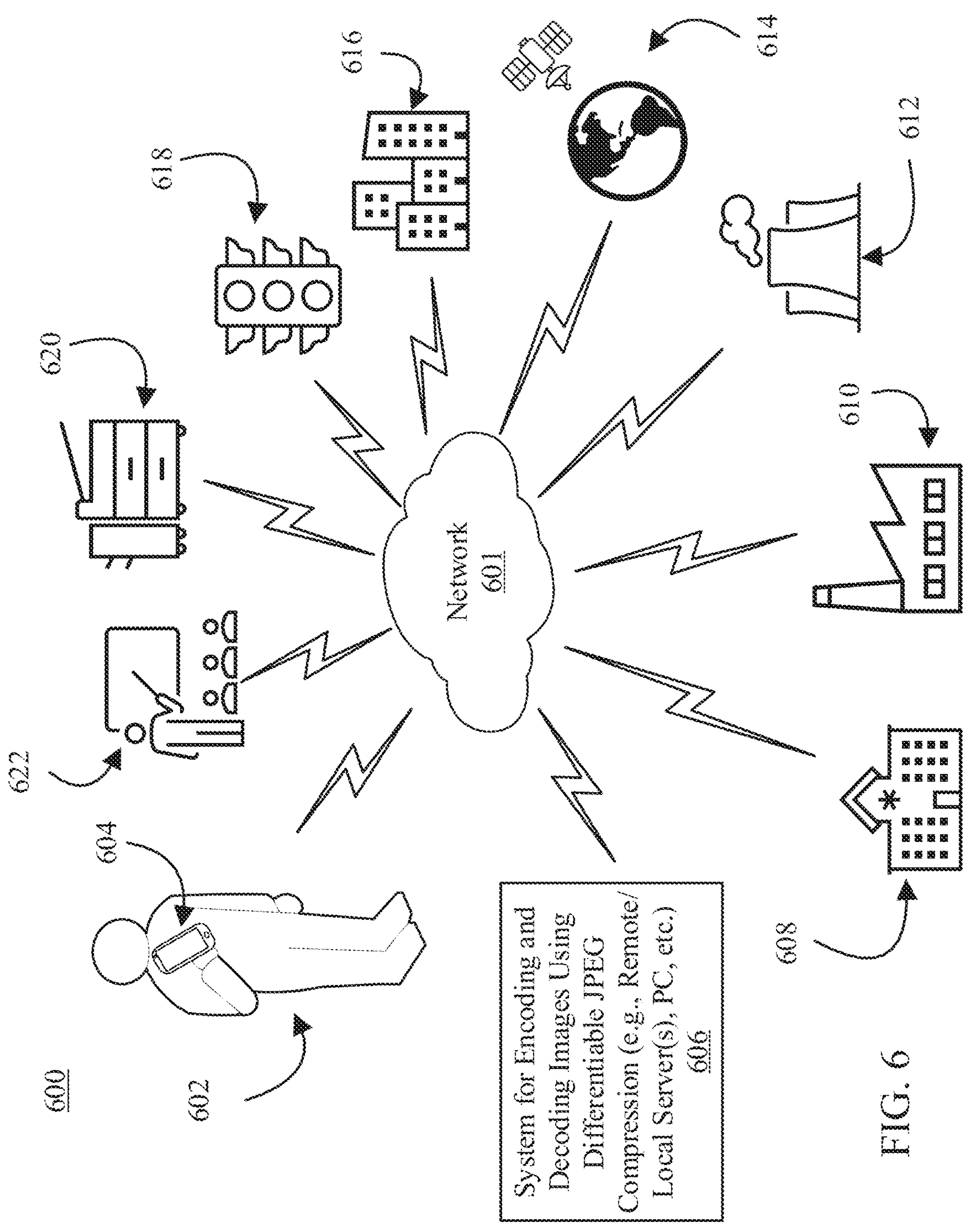
FIG. 6 is a diagram illustratively depicting a system and method for encoding and decoding images using differentiable Joint Photographic Experts Group (JPEG) compression for diverse applications and environments to enhance image quality, optimize storage, and facilitate efficient transmission, in accordance with embodiments of the present invention.

Referring now to FIG. 6, a diagram showing a system and method 600 for encoding and decoding images using differentiable Joint Photographic Experts Group (JPEG) compression for diverse applications and environments to enhance image quality, optimize storage, and facilitate efficient transmission, is illustratively depicted in accordance with embodiments of the present invention. The system and method 600 can be implemented on various platforms including remote or local servers, personal computers (PCs), and other computing devices. The system can be utilized to integrate the process of converting images from the Red-Green-Blue (RGB) color space to the Luminance-Chrominance (YCbCr) color space, applying chroma subsampling, performing discrete cosine transforms (DCT), quantizing DCT coefficients, encoding and decoding the quantized data, dequantizing, and transforming the data back to the RGB color space. This can be used for optimizing image storage and transmission while maintaining comparatively high image quality, making it suitable for numerous applications in various industries, in accordance with aspects of the present invention.

In various embodiments, a computing network 601 can be utilized for connecting various local and/or remote components of the system, and can be, for example, a local area network (LAN), wide area network (WAN), or the Internet. This network allows for the transmission and reception of image data to and from various devices and servers, facilitating distributed image processing tasks and enabling access to the system's functionalities from remote locations. The network infrastructure can support comparatively high-speed data transfer, ensuring that large image files can be processed and transmitted efficiently, thereby supporting real-time applications and remote collaborations. A user 602 can interact with various components of the system through a user interface on a user device 604. The user can upload images for processing, configure JPEG compression parameters, and download processed images. The user interface can be accessible through various devices including PCs, smartphones, and tablets, providing flexibility and ease of use. Users can include, for example, professionals from different fields such as healthcare, manufacturing, and education who require efficient image compression and transmission capabilities.

The user device 604 can be any electronic device equipped with a display and input capabilities, such as a smartphone, tablet, or computer. This device allows the user to access the system's interface, upload images, set compression parameters, and receive the processed images. The user device communicates with the system via the computing network, ensuring seamless interaction and data exchange. User devices can support various operating systems and applications, making the system versatile and accessible. A server 606 can host the core functionalities of the differentiable JPEG compression system. This includes processing image data, performing the necessary transformations and compressions, and managing user requests. The server can be a remote cloud-based server or a local server within an enterprise network, ensuring robust and scalable processing capabilities. The server can handle multiple concurrent requests, process comparatively large volumes of data, and provide secure access to the system's services.

In block 608, the differentiable JPEG compression system can be applied in a hospital setting. Medical images such as X-rays, MRIs, and CT scans can be compressed using the system, reducing storage requirements while maintaining image quality. The compressed images can be easily transmitted across the hospital network for diagnosis and consultation, enhancing efficiency in medical workflows. The system can support telemedicine by allowing doctors to share high-quality medical images with specialists in remote locations, facilitating timely and accurate diagnoses. In block 610, the system can be utilized in a manufacturing facility for the compression of industrial images. Images from quality control processes, machine inspections, and production line monitoring can be compressed to save storage space and bandwidth. The compressed images can be transmitted to central control systems for analysis and decision-making, aiding in maintaining high standards of manufacturing quality. The system can support predictive maintenance by enabling the efficient storage and analysis of large volumes of machine inspection images, helping to prevent equipment failures and reduce downtime.

In block 612, the system can be employed in an industrial plant to manage and compress images from various sensors and cameras monitoring plant operations. This includes images from safety inspections, equipment monitoring, and process control systems. The compressed images facilitate real-time monitoring and data analysis, improving operational efficiency and safety. The system can also support environmental monitoring by compressing and transmitting images from sensors monitoring air quality, emissions, and other environmental parameters. In block 614, the system can support global satellite communications by compressing satellite images before transmission to ground stations. This reduces the bandwidth required for transmitting high-resolution images from satellites to Earth, making the process more efficient and cost-effective. The compressed images can then be used for various applications such as weather forecasting, environmental monitoring, and global mapping. The system can enhance disaster response efforts by enabling the rapid transmission of satellite images of affected areas, providing critical information for rescue and relief operations.

In block 616, corporate offices can use the system to compress and manage large volumes of digital images used in presentations, reports, and marketing materials. The system ensures that high-quality images are maintained while reducing file sizes, facilitating faster sharing and storage. This enhances collaboration and productivity across various corporate departments. The system can support virtual meetings by compressing and transmitting high-quality images and documents, enabling efficient communication and collaboration among team members. In block 618, the system can be applied to traffic control systems to compress images from traffic cameras. These compressed images can be transmitted to central traffic management centers for real-time analysis and decision-making. The system aids in efficient monitoring of traffic flow, detection of incidents, and implementation of traffic control measures. The system can support smart city initiatives by integrating with other urban infrastructure systems to provide comprehensive traffic management solutions.

In block 620, office equipment such as printers, scanners, and copiers can integrate the differentiable JPEG compression system to handle image data more efficiently. Scanned documents and printed images can be compressed to reduce storage space and improve transfer speeds. This integration enhances the functionality and performance of office equipment, making document management more efficient. The system can support secure document transmission by compressing and encrypting scanned documents before sending them over the network. In block 622, educational institutions can utilize the system to compress and manage digital images used in online learning platforms, research publications, and administrative records. The compressed images maintain high quality for educational content delivery and archival purposes, supporting the digital infrastructure of schools, colleges, and universities. The system can enhance remote learning by enabling the efficient transmission of high-quality educational materials to students, facilitating interactive and engaging learning experiences. By implementing these practical applications, the differentiable JPEG compression system provides significant benefits across various real-world environments by, for example, enhancing efficiency, reducing storage requirements, and improving image transmission capabilities, in accordance with aspects of the present invention.

Figure 7:
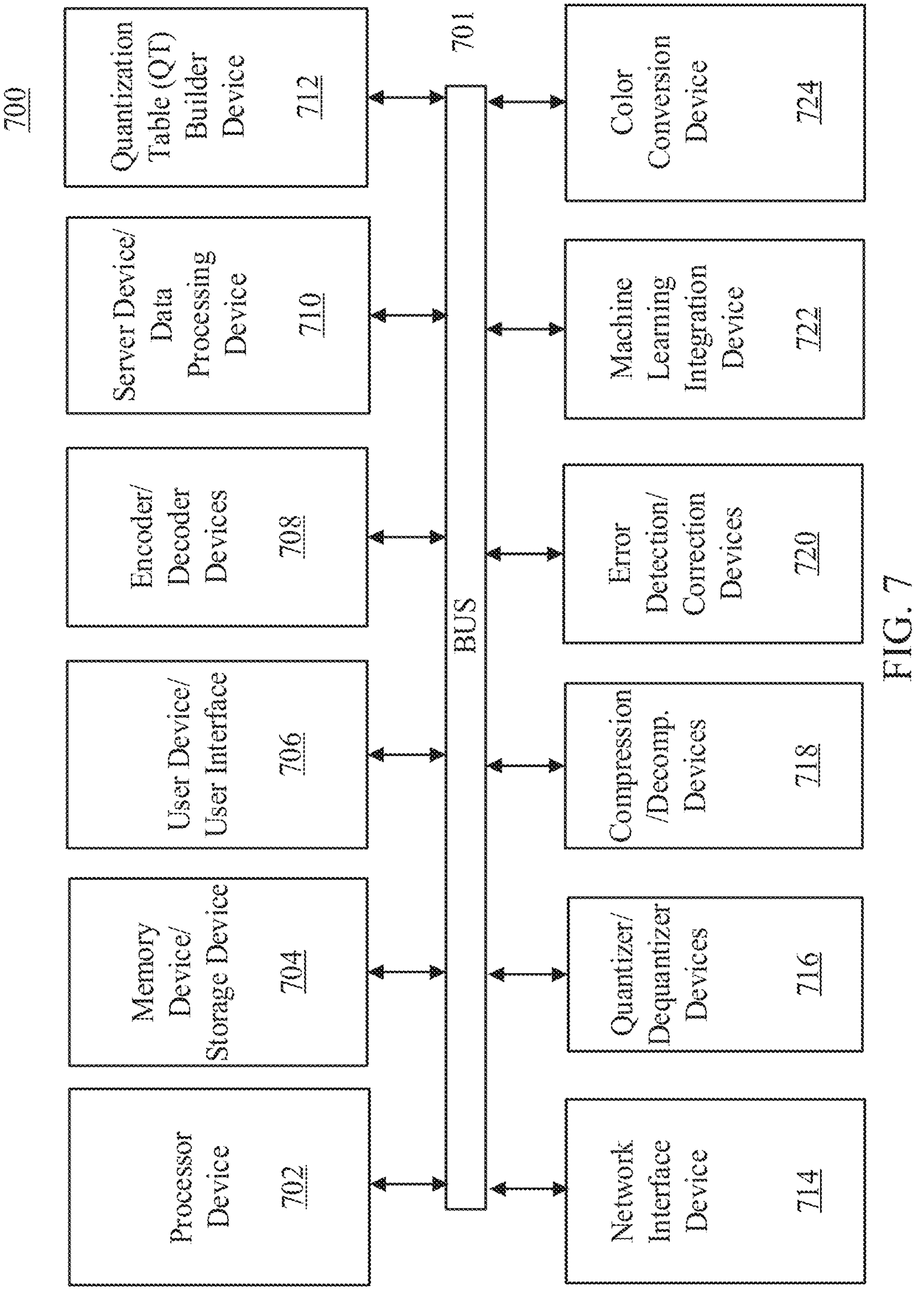
FIG. 7 is a diagram illustratively depicting a system for encoding and decoding images using differentiable Joint Photographic Experts Group (JPEG) compression, including color conversion, quantization, and dequantization, in accordance with embodiments of the present invention.

Referring now to FIG. 7, a diagram showing a system 700 for encoding and decoding images using differentiable Joint Photographic Experts Group (JPEG) compression, including color conversion, quantization, and dequantization, is illustratively depicted in accordance with embodiments of the present invention. The system 700 can include various interconnected devices and components that work together to achieve efficient image compression and decompression, and can efficiently handle comparatively large volumes of image data, perform complex transformations, and maintain comparatively high image quality while ensuring compatibility with machine learning applications, in accordance with aspects of the present invention.

In various embodiments, a bus 701 can be used to interconnect various components of the system. The bus facilitates communication and data transfer between different devices, ensuring smooth and efficient operation of the system. It can support comparatively high-speed data transfer and provide a unified communication pathway for all connected devices. The bus architecture is particularly useful for synchronizing the operations of different components, enabling them to work together seamlessly.

A processor device 702 can be utilized to execute the instructions for the differentiable JPEG compression and decompression processes. The processor can handle complex computations, manage data flow, and coordinate the activities of other components. It can include one or more central processing units (CPUs) or graphics processing units (GPUs) to provide the necessary computational power. The processor device can execute the core algorithms for color conversion, chroma subsampling, DCT, quantization, and other steps involved in the JPEG compression workflow.

A memory device/storage device 704 can be utilized to store the instructions and data required for the JPEG compression and decompression processes. The memory can include both volatile memory (such as RAM) and non-volatile memory (such as SSDs or HDDs). It can store the original image data, intermediate results, quantization tables, and other necessary information. The storage device can provide additional capacity to store compressed images, original images, and other data. The combination of memory and storage devices ensures quick access to data and supports the efficient execution of the compression algorithms.

A user device/user interface 706 can be provided to facilitate interaction between the user and the system. The user device can be any electronic device equipped with a display and input capabilities, such as a smartphone, tablet, or computer. The user interface can be graphical (GUI) or command-line based, allowing users to upload images, configure compression settings, and download processed images. This combination allows the user to interact with the system, ensuring seamless interaction and data exchange. The user device and interface provide an intuitive and user-friendly experience, making it easy for users to utilize the system's capabilities. Encoder and decoder devices 708 can be utilized to handle the encoding and decoding of image data. Encoders can transform image data from its original format into a compressed format using the differentiable JPEG compression process. This involves steps such as color conversion, chroma subsampling, DCT, and quantization. Decoders can reverse this process, reconstructing the original image from the compressed data by performing dequantization, inverse DCT, chroma upsampling, and color conversion. The encoder and decoder devices ensure efficient compression and accurate reconstruction of images, maintaining high image quality.

A server device/data processing device 710 can be utilized to host the core functionalities of the differentiable JPEG compression system. The server can process image data, perform necessary transformations and compressions, and manage user requests. It can be a remote cloud-based server or a local server within an enterprise network, providing robust and scalable processing capabilities. The data processing device can handle tasks such as image resizing, format conversion, and metadata management. This ensures that the image data is in the correct format and resolution for the compression process, and that the processed images meet the desired specifications.

A quantization table (QT) builder device 712 can be utilized to compute and manage the quantization tables used in the JPEG compression process. This device can dynamically generate quantization tables based on the JPEG quality parameter, which determines the level of compression and image quality. The QT builder device can scale the quantization tables according to the desired quality settings, ensuring that the compression process is adaptable and flexible. It can apply a differentiable approximation of the floor function to the quantization values, allowing gradients to propagate through the quantization step. The QT builder device can also clip the quantization values to remain within the standard JPEG range, ensuring compliance with JPEG standards. By providing accurate and adaptable quantization tables, the QT builder device plays a particularly useful role in optimizing the balance between compression efficiency and image quality. A network interface device 714 can be used to connect the system to various networks, such as a local area network (LAN), wide area network (WAN), or the Internet. This device enables the transmission and reception of image data to and from other devices and servers, facilitating distributed image processing tasks. The network interface ensures high-speed data transfer, supporting real-time applications and remote collaborations. It plays a particularly useful role in enabling the system's connectivity and accessibility.

Quantizer and dequantizer devices 716 can be utilized to perform the quantization and dequantization of DCT coefficients. The quantizer can reduce the precision of the DCT coefficients by dividing them by values from a quantization table and rounding the results. This step compresses the image data by reducing its size. The dequantizer can reverse this process by multiplying the quantized coefficients by the same quantization table values, restoring their precision. These devices ensure that the quantization process is differentiable, allowing gradients to propagate through the compression pipeline, making it suitable for integration with machine learning frameworks. Compression and decompression devices 718 can be utilized to handle the process of image compression and decompression. The compression device can execute steps such as color conversion, chroma subsampling, DCT, and quantization to transform image data into a compressed format. The decompression device can reverse these steps, performing dequantization, inverse DCT, chroma upsampling, and color conversion to reconstruct the original image from the compressed data. This combination ensures that the system can efficiently compress and decompress images, maintaining comparatively high image quality and supporting various applications.

Error detection and correction devices 720 can be utilized to enhance the robustness and reliability of the image compression process. This device can monitor the integrity of the image data during both compression and decompression steps. It can identify errors that may occur due to data corruption, transmission issues, or processing faults. The error detection component can use techniques such as checksums or parity bits to detect anomalies in the data. Once errors are detected, the correction component can employ algorithms such as Reed-Solomon coding or convolutional codes to correct the errors and restore the data to its correct, appropriate state. This device ensures that the image data remains accurate and reliable, making the system especially suitable for critical applications where data integrity is paramount, such as medical imaging and industrial inspection.

A machine learning integration device 722 can be used to incorporate the differentiable JPEG compression system into machine learning pipelines. This device can handle the integration of the compression algorithms with gradient-based optimization methods, enabling the use of JPEG compression in deep learning applications. It ensures that the compression and decompression processes are compatible with machine learning frameworks, providing accurate gradients for training and optimization. The machine learning integration device enhances the system's applicability in advanced computational tasks, such as image recognition, enhancement, and real-time transmission.

A color conversion device 724 can be utilized for conversion of images between different color spaces. During compression, this device can convert images from the Red-Green-Blue (RGB) color space to the Luminance-Chrominance (YCbCr) color space. This conversion separates the luminance and chrominance components, allowing for more efficient compression. During decompression, the device can reverse this conversion, transforming the YCbCr image back to the RGB color space. The color conversion device ensures accurate color representation and compatibility with standard image formats, in accordance with aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment," as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for encoding and decoding images using differentiable Joint Photographic Experts Group (JPEG) compression, comprising:

converting an image from a Red-Green-Blue (RGB) color space to a Luminance-Chrominance (YCbCr) color space to obtain a luminance channel and chrominance channels, and applying chroma subsampling to the chrominance channels to reduce resolution;

dividing the YCbCr image into pixel blocks and performing a discrete cosine transform (DCT) on each of the pixel blocks to obtain DCT coefficients;

quantizing the DCT coefficients using a scaled quantization table (SQT) to generate quantized DCT coefficients and reduce precision by:

computing SQT values with a differentiable floor function that utilizes a polynomial rounding function to approximate a floor of numerical values for the SQT;

maintaining non-zero gradients of the SQT values by utilizing a differentiable clipping function that computes a soft approximation of the SQT values based on an integer range of the JPEG compression and a scale parameter; and applying the SQT to DCT patches of the image by rounding a result from dividing DCT coefficients with a corresponding value in the SQT;

encoding the quantized DCT coefficients using lossless entropy coding to generate a compressed JPEG file and decoding the compressed JPEG file by reversing the lossless entropy coding to obtain the quantized DCT coefficients;

dequantizing the quantized DCT coefficients using the scaled quantization table to generate dequantized DCT coefficients to restore the precision;

applying an inverse discrete cosine transform (IDCT) to the dequantized DCT coefficients to convert the dequantized DCT coefficients back to a spatial domain; and upsampling the chrominance channels to an original resolution, and converting the YCbCr image back to the RGB color space.

2. The method of claim 1, wherein converting the RGB image to the YCbCr color space comprises applying a pixel-wise affine transformation.

3. The method of claim 1, wherein the chroma subsampling involves anti-aliasing using a 2D convolution followed by downsampling.

4. The method of claim 1, wherein a scale factor for the quantization table is computed based on a JPEG quality parameter, and the quantization table is scaled by the scale factor.

5. The method of claim 1, wherein the encoding the quantized DCT coefficients using lossless entropy coding comprises arranging the coefficients in a zigzag order, performing run-length encoding, and applying Huffman coding.

6. The method of claim 1, wherein the decoding further comprises clipping output pixel values to ensure they remain within a valid range by utilizing a product of the output pixel values and the scale parameter when the pixel values are outside the valid range.

7. The method of claim 1, further comprising using a straight-through estimator (STE) technique during the encoding and the decoding to execute accurate gradient propagation for machine learning applications.

8. A system for encoding and decoding images using a differentiable JPEG approach, comprising:

a processor device; and a memory storing instructions that, when executed by the processor device, cause the system to:

convert an image from a Red-Green-Blue (RGB) color space to a Luminance-Chrominance (YCbCr) color space to obtain a luminance channel and chrominance channels, and apply chroma subsampling to the chrominance channels to reduce resolution;

divide the YCbCr image into pixel blocks and performing a discrete cosine transform (DCT) on each of the pixel blocks to obtain DCT coefficients;

quantize the DCT coefficients using a scaled quantization table (SQT) to generate quantized DCT coefficients and reduce precision by:

computing SQT values with a differentiable floor function that utilizes a polynomial rounding function to approximate a floor of numerical values for the SQT;

maintaining non-zero gradients of the SQT values by utilizing a differentiable clipping function that computes a soft approximation of the SQT values based on an integer range of a JPEG compression and a scale parameter; and applying the SQT to DCT patches of the image by rounding a result from dividing DCT coefficients with a corresponding value in the SQT;

encode the quantized DCT coefficients using lossless entropy coding to generate a compressed JPEG file, and decode the compressed JPEG file by reversing the lossless entropy coding to obtain the quantized DCT coefficients;

dequantize the quantized DCT coefficients using the scaled quantization table to generate dequantized DCT coefficients to restore the precision;

apply an inverse discrete cosine transform (IDCT) to the dequantized DCT coefficients to convert the dequantized DCT coefficients back to a spatial domain; and upsample the chrominance channels to an original resolution, and converting the YCbCr image back to the RGB color space.

9. The system of claim 8, wherein the instructions for converting the RGB image to the YCbCr color space comprise instructions for applying a pixel-wise affine transformation.

10. The system of claim 8, wherein the instructions for chroma subsampling include instructions for performing anti-aliasing using a 2D convolution followed by downsampling.

11. The system of claim 8, wherein a scale factor for the quantization table is computed based on a JPEG quality parameter, and the instructions for scaling the quantization table include instructions for computing the scale factor based on the JPEG quality parameter.

12. The system of claim 8, wherein the instructions for encoding the quantized DCT coefficients using lossless entropy coding include instructions for arranging the coefficients in a zigzag order, performing run-length encoding, and applying Huffman coding.

13. The system of claim 8, wherein the instructions for the decoding further include instructions for clipping output pixel values to ensure they remain within a valid range by utilizing a product of the output pixel values and the scale parameter when the pixel values are outside the valid range.

14. The system of claim 8, wherein the instructions further include using a straight-through estimator (STE) technique during the encoding and decoding to execute accurate gradient propagation for machine learning applications.

15. A computer program product for encoding and decoding images using a differentiable JPEG approach, the computer program product comprising a non-transitory computer-readable storage medium having program instructions embodied therewith, the program instructions executable by a hardware processor to cause the hardware processor to:

convert an image from a Red-Green-Blue (RGB) color space to a Luminance-Chrominance (YCbCr) color space to obtain a luminance channel and chrominance channels, and apply chroma subsampling to the chrominance channels to reduce resolution;

divide the YCbCr image into pixel blocks and performing a discrete cosine transform (DCT) on each of the pixel blocks to obtain DCT coefficients;

quantize the DCT coefficients using a scaled quantization table (SQT) to generate quantized DCT coefficients and reduce precision by:

computing SQT values with a differentiable floor function that utilizes a polynomial rounding function to approximate a floor of numerical values for the SQT;

maintaining non-zero gradients of the SQT values by utilizing a differentiable clipping function that computes a soft approximation of the SQT values based on an integer range of a JPEG compression and a scale parameter; and applying the SQT to DCT patches of the image by rounding a result from dividing DCT coefficients with a corresponding value in the SQT;

encode the quantized DCT coefficients using lossless entropy coding to generate a compressed JPEG file, and decode the compressed JPEG file by reversing the lossless entropy coding to obtain the quantized DCT coefficients;

dequantize the quantized DCT coefficients using the scaled quantization table to generate dequantized DCT coefficients to restore the precision;

apply an inverse discrete cosine transform (IDCT) to the dequantized DCT coefficients to convert the dequantized DCT coefficients back to a spatial domain; and upsample the chrominance channels to an original resolution, and converting the YCbCr image back to the RGB color space.

16. The computer program product of claim 15, wherein the program instructions for converting the RGB image to the YCbCr color space comprise instructions for applying a pixel-wise affine transformation.

17. The computer program product of claim 15, wherein the program instructions for chroma sub sampling include instructions for performing anti-aliasing using a 2D convolution followed by downsampling.

18. The computer program product of claim 15, wherein a scale factor for the quantization table is computed based on a JPEG quality parameter, and the program instructions for scaling the quantization table include instructions for computing the scale factor based on the JPEG quality parameter.

19. The computer program product of claim 15, wherein the program instructions for encoding the quantized DCT coefficients using lossless entropy coding include instructions for arranging the coefficients in a zigzag order, performing run-length encoding, and applying Huffman coding.

20. The computer program product of claim 15, wherein the program instructions for decoding further include instructions for clipping output pixel values to ensure they remain within a valid range by utilizing a product of the output pixel values and the scale parameter when the pixel values are outside the valid range.

* * * * *